US009145061B2

United States Patent
Wada et al.

(10) Patent No.: US 9,145,061 B2
(45) Date of Patent: Sep. 29, 2015

(54) HYBRID-VEHICLE POWER GENERATOR CONTROL APPARATUS

(75) Inventors: Yasuhiko Wada, Tokyo (JP); Hisanori Yamasaki, Tokyo (JP); Keita Hatanaka, Tokyo (JP); Hidetoshi Kitanaka, Tokyo (JP); Yuruki Okada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 4 days.

(21) Appl. No.: 14/346,869

(22) PCT Filed: Dec. 14, 2011

(86) PCT No.: PCT/JP2011/078886
§ 371 (c)(1),
(2), (4) Date: Mar. 24, 2014

(87) PCT Pub. No.: WO2013/088523
PCT Pub. Date: Jun. 20, 2013

(65) Prior Publication Data
US 2014/0232112 A1    Aug. 21, 2014

(51) Int. Cl.
*B60W 10/08* (2006.01)
*B60L 11/02* (2006.01)
(Continued)

(52) U.S. Cl.
CPC . *B60L 11/02* (2013.01); *B60K 6/46* (2013.01); *B60W 10/08* (2013.01); *B60W 20/00* (2013.01); *B60L 2200/26* (2013.01); *B60W 2710/086* (2013.01); *Y02T 10/6217* (2013.01)

(58) Field of Classification Search
CPC ..................................................... B60W 10/08
USPC ........................................... 477/3; 290/40 C
See application file for complete search history.

(56) References Cited

U.S. PATENT DOCUMENTS 8,062,169 B2 *  11/2011  Marr et al. .................. 477/3
2001/0020554 A1  9/2001  Yanase et al.
(Continued)

FOREIGN PATENT DOCUMENTS

JP   8-256403   10/1996
JP   2001-238303   8/2001
(Continued)

OTHER PUBLICATIONS

International Search Report issued Mar. 13, 2012, in PCT/JP11/078886 filed Dec. 14, 2011.
(Continued)

*Primary Examiner* — Joseph Waks
(74) *Attorney, Agent, or Firm* — Oblon, McClelland, Maier & Neustadt, L.L.P.

(57) ABSTRACT

A hybrid-vehicle power generator control apparatus. Based on a difference electric power value, which corresponds to the difference between an electric power generator power command value given by a higher-hierarchy control unit and an output voltage value of an electric power generator, an electric power generator control unit calculates an electric power generator rotation speed command value and based on the calculated electric power generator rotation speed command value, the electric power generator control unit PWM-controls an output of the electric-power conversion system that performs electric conversion between the electric power generator and a battery, so that the rotation speed of the electric power generator is made to keep track of the electric power generator rotation speed command value and the output electric power value of the electric power generator is made to keep track of the electric power generator power command value.

7 Claims, 5 Drawing Sheets

(51) Int. Cl.
*B60K 6/46* (2007.10)
*B60W 20/00* (2006.01)

(56) References Cited

U.S. PATENT DOCUMENTS

2004/0020697 A1* 2/2004 Field ............................ 180/65.2
2008/0269009 A1* 10/2008 Marr et al. ........................ 477/3
2014/0062349 A1* 3/2014 Isayeva et al. ................. 318/139

FOREIGN PATENT DOCUMENTS

| JP | 2001-238493 | | 8/2001 |
| JP | 2007-195334 | | 8/2007 |
| JP | 2008247273 A | * | 10/2008 |
| JP | 2009255876 A | * | 11/2009 |
| JP | 2010143306 A | * | 7/2010 |
| JP | 2011-73643 A | | 4/2011 |
| JP | 2011-148460 | | 8/2011 |
| JP | 2011219041 A | * | 11/2011 |

OTHER PUBLICATIONS

Office Action issued Apr. 7, 2015 in Japanese Patent Application No. 2013-548996 (with English language translation).

* cited by examiner

HYBRID-VEHICLE POWER GENERATOR CONTROL APPARATUS

TECHNICAL FIELD

The present invention relates to a hybrid-vehicle power generator control apparatus in which an electric power generator converts the output of an engine into electric power and the electric power obtained through the conversion and the electric power from a battery drive a motor so that a vehicle travels.

BACKGROUND ART

A railroad vehicle is characterized in that because it travels by means of its iron wheels rolling over rail surfaces, its traveling resistance is smaller than that of an automobile. In particular, in a recent electric railroad vehicle, regenerative brake control is performed in which the main motor is operated as an electric power generator at the braking mode so that braking force is obtained and in which electric energy generated by the main motor at the braking mode is returned to the overhead line so as to be recycled as power running energy for other vehicles. It is known that an electric railroad vehicle equipped with a regenerative brake travels with approximately half energy consumption in comparison with an electric railroad vehicle that is not equipped with any regenerative brake. Therefore, an electric railroad vehicle equipped with a regenerative brake is an energy-saving one that effectively utilizes its characteristic that the traveling resistance is small.

Meanwhile, it is the present situation that in a local railroad or the like where the transportation density is low, meticulous passenger service is realized at low cost, by utilizing a diesel railcar that does not require any infrastructure such as an overhead line or a substation. However, because a diesel railcar has no means for regenerate energy for other vehicles through an overhead line or the like, the recycle of regenerative energy, which is performed by an electric railroad vehicle, has not been carried out. Accordingly, it has been considered that in order to realize energy-saving travel of a diesel railcar, there is no choice but to rely on the development of a high-mileage engine.

As a method of promoting energy saving even for such a diesel railcar, there has been proposed a hybrid diesel railcar in which an engine, an electric power generator, and an electric storage device are combined with one another (e.g., refer to Patent Document 1). In the hybrid diesel railcar, because a battery is provided, it is made possible that at the braking mode, the battery temporarily absorbs generative energy generated by the main motor, and the absorbed regenerative energy is recycled as part of energy required at the power running mode so that the energy saving can be realized.

In contrast, when the hybrid diesel railcar continues to descend a long distance with the regenerative brake, the battery is overcharged; thus, it is required to suppress the battery charging power through some sort of method. As a method for that, there is utilized a so-called engine brake in which the electric power generator is operated as a motor and the engine is utilized as a rotation friction load so that energy is intentionally consumed. In contrast, it is also made possible that as braking force for a vehicle, not a regenerative brake but a mechanical brake is utilized so that energy itself is suppressed and hence overcharging is prevented; however, when the time and trouble for the maintenance of a brake shoe, which wears away, is taken into consideration, it is desirable to refrain from utilizing the mechanical brake as much as possible; therefore, the usage of the engine brake has advantage.

The hybrid diesel railcar disclosed in Patent Document 1 is configured with an engine, an AC power generator that is driven by the engine so as to output AC power, a converter that converts AC power into DC power, an inverter that inverts DC power into AC power, a motor that drives a railroad vehicle, a speed reducer that reduces the rotation of the motor and transfers it to a wheel axle, an electric storage device that has a function of performing charging and discharging with DC power, a service-power-source inverter, a service-power-source transformer, and a control apparatus; however, the control method at the foregoing engine braking mode is not described in detail.

PRIOR ART REFERENCE

Patent Document

[Patent Document 1] Japanese Patent Application Laid-Open No. 2007-195334
[Non-Patent Document 1] "Motor Control Engineering—Basic Variable-Speed Driving" by Kohki Matsuse, Page 98
[Non-Patent Document 2] "Theory and Design of AC Servo System, From Basic Theory to Software Servo" by Hidehiko Sugimoto, Masato Koyama, and Shinzo Tamai, Page 99 through 103

DISCLOSURE OF THE INVENTION

Problem(s) to be Solved by the Invention

In general, for a single and the same driving command, the output characteristic varies depending on the operation conditions (such as the oil temperature and the lubrication condition) and the maintenance situation; therefore, it is difficult to obtain a stable engine output over a long-time operation. This fact applies also to the foregoing conventional hybrid vehicle. Therefore, in a conventional hybrid-vehicle power generator control apparatus, there has been a problem that due to the variation, in the engine output characteristic, that depends on the operation conditions (such as the oil temperature and the lubrication condition) and the maintenance situation, it is difficult to maintain stable generated electric power.

The present invention has been implemented in order to solve the foregoing problem in a conventional hybrid-vehicle power generator control apparatus; the objective thereof is to provide a hybrid-vehicle power generator control apparatus that can maintain stable generated electric power, regardless of the variation, in the engine output characteristic, that depends on the operation conditions and the maintenance situation.

Means for Solving the Problems

A hybrid-vehicle power generator control apparatus according to the present invention is provided with an electric power generator whose rotor is coupled with an output shaft of an engine, an electric-power conversion system that performs electric power conversion between the electric power generator and a load apparatus, an electric power generator control unit that PWM-controls the electric-power conversion system so as to control an output of the electric power generator, a load monitoring unit that monitors status of the load apparatus, and a higher-hierarchy control unit that issues an electric power generator power command value to the electric power generator control unit, based on the status of the load apparatus detected by the load monitoring unit; the hybrid-vehicle power generator control apparatus is characterized in that based on a difference electric power value, which corresponds to the difference between the electric power generator power command value given by the higher-hierarchy control unit and an output electric power value of the electric power generator, the electric power generator control unit calculates an electric power generator rotation speed command value and based on the calculated electric power generator rotation speed command value, the electric power generator control unit PWM-controls an output of the electric-power conversion system, so that the rotation speed of the electric power generator is made to keep track of the electric power generator rotation speed command value and the output electric power value of the electric power generator is made to keep track of the electric power generator power command value.

Advantage of the Invention

In the hybrid-vehicle power generator control apparatus according to the present invention, based on a difference electric power value, which corresponds to the difference between the electric power generator power command value given by the higher-hierarchy control unit and an output electric power value of the electric power generator, the electric power generator control unit calculates an electric power generator rotation speed command value and based on the calculated electric power generator rotation speed command value, the electric power generator control unit PWM-controls an output of the electric-power conversion system, so that the rotation speed of the electric power generator is made to keep track of the electric power generator rotation speed command value and the output electric power value of the electric power generator is made to keep track of the electric power generator power command value; therefore, desired generated electric power can stably be obtained, regardless of variations, in the engine characteristics, that are caused by the operation condition and the maintenance situation of the engine.

BEST MODE FOR CARRYING OUT THE INVENTION

Embodiment 1

Figure 1:
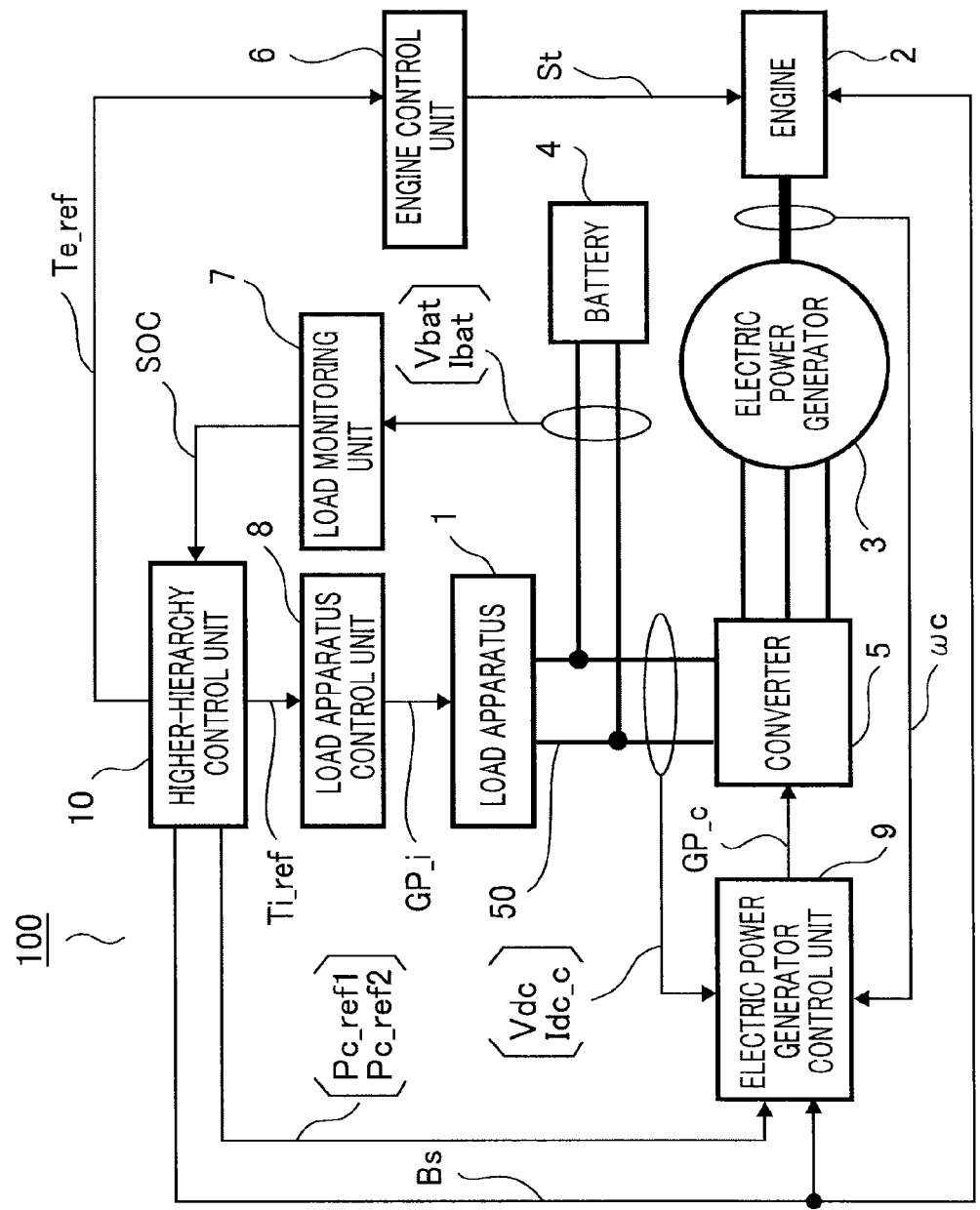
FIG. 1 is a system block diagram illustrating the configuration of a hybrid-vehicle power generator control apparatus according to Embodiment 1 of the present invention.

Hereinafter, a hybrid-vehicle power generator control apparatus according to Embodiment 1 of the present invention will be explained with reference to the drawings. FIG. 1 is a system block diagram illustrating the configuration of a hybrid-vehicle power generator control apparatus according to Embodiment 1 of the present invention; FIG. 1 shows a case where the hybrid-vehicle power generator control apparatus is utilized in a railroad hybrid vehicle. In FIG. 1, a hybrid-vehicle power generator control apparatus 100 is provided with a load apparatus 1, an engine 2, an electric power generator 3, a battery 4, a converter 5 as an electric-power conversion system, an engine control unit 6 that controls the engine 2, a load monitoring unit 7 that controls the battery 4, a load apparatus control unit 8 that controls the load apparatus 1, an electric power generator control unit 9 that controls the electric power generator 3, and a higher-hierarchy control unit 10 that controls the control units 6 through 9.

The load apparatus 1 is configured with driving wheels, a wheel axle, an inverter as an electric-power conversion system in the load apparatus 1, a motor for driving a vehicle, and a speed reducer that reduces the rotation of the motor and transfers it to the wheel axle (none of these elements is illustrated). The foregoing inverter is configured with a plurality of switching devices and a rectifying device; the inverter inverts DC power supplied from at least one of the battery 4 and the converter 5 into AC power and supplies the AC power to the motor. When the motor in the load apparatus 1 is operated in a regenerative manner, the inverter can perform the inverse conversion operation in which AC power regenerated by the motor is converted into DC power. The motor in the load apparatus 1 is, for example, a three-phase AC motor; the motor produces driving force and transfers the driving force to the driving wheels through the intermediary of the speed reducer. The motor can operate also as an electric power generator; when the vehicle is decelerated, the motor is driven through the driving wheels so as to generate regenerative electric power and hence the deceleration energy of the vehicle is regenerated.

The engine 2 is, for example, a diesel engine and transfers driving force for generating electric power to the electric power generator 3. When the motor in the load apparatus 1 is operated in a regenerative manner, the engine 2 can perform the operation of engine brake and the operation of a so-called exhaust brake in which by closing a valve provided in the exhaust pipe, the exhaust pressure is raised and hence the pumping loss in the engine 2 is enlarged so that the rotation speed is suppressed. Moreover, the engine 2 can also perform switching between the engine brake and the exhaust brake by on/off-controlling the exhaust valve.

The electric power generator 3 is, for example, a three-phase AC power; the rotor thereof is rotated by the driving force of the engine 2 so as to generate electric power; the electric power generator 3 functions as an power supplying source that supplies the generated electric power to at least one of the load apparatus 1 and the battery 4. The electric power generator 3 can work also as a motor and can consume electric power by cranking the engine 2 when the engine 2 starts or by making the engine 2 rotate by use of the driving force of the electric power generator 3.

The battery 4 is, for example, a lithium ion secondary battery; the battery 4 is connected with a DC link unit 50 between the converter 5 and the inverter in the load apparatus 1; the battery 4 is charged with the output electric power of the electric power generator 3 and the regenerative electric power of the motor in the load apparatus 1 or supplies driving electric power to the electric power generator 3 and the motor in the load apparatus 1.

The converter 5 as an electric-power conversion system is configured with a plurality of switching devices and a rectifying device, connected with the electric power generator 3, the battery 4, and the load apparatus 1, and converts AC power generated by the electric power generator 3 into DC power. When the electric power generator 3 is operated as a motor, the converter 5 performs the inverse conversion operation in which DC power supplied from the battery 4 or the load apparatus 1 is converted into AC power.

Based on an engine torque command value Te_ref issued from the higher-hierarchy control unit 10 and signals such as the engine rotation speed and the like detected by a sensor (unillustrated) provided in the engine 2, the engine control unit 6 controls a throttle opening degree St, the ignition timing, the fuel injection amount, and the like of the engine 2 in such a way that the engine 2 produces the torque corresponding to the engine torque command value Te_ref.

Based on a battery voltage value Vbat and a discharge current of the battery 4 or a battery current value Ibat as the discharge current detected by a voltage sensor and a current sensor, respectively, provided in the intermediate DC link unit 50 between the load apparatus 1 and the converter 5, the load monitoring unit 7 estimates a charging state SOC of the battery 4 and then outputs the charging state SOC to the higher-hierarchy control unit 10.

The load apparatus control unit 8 generates a gate signal GP_i, which is a so-called PWM switching signal, for controlling the inverter in the load apparatus 1 in such a way that the torque of the motor in the load apparatus 1 keeps track of a motor torque command value Ti_ref issued from the higher-hierarchy control unit 10, and outputs the generated gate signal GP_i to the load apparatus 1 so as to control the inverter in the load apparatus 1.

In accordance with the statuses of an electric power generator power command value Pc_ref1 or an electric power generator power consumption command value Pc_ref2 issued from the higher-hierarchy control unit 10, a rotation speed ωc of the electric power generator 3 detected by a speed sensor (unillustrated), a DC voltage value Vdc of the intermediate DC link unit 50 detected by a voltage sensor (unillustrated), a DC current value Idc inputted to or outputted from the converter 5, a driving command value Se outputted from the higher-hierarchy control unit 10, and the like, the electric power generator control unit 9 switching-controls the switching devices included in the converter 5 so as to control the electric power of the electric power generator 3. Both the electric power generator power command value Pc_ref1 and the electric power generator power consumption command value Pc_ref2 are included in an electric power generator power command value.

The higher-hierarchy control unit 10 has a function of managing the whole operation of the foregoing constituent elements; based on information items on the electric power given or received by the load apparatus 1, the charging status SOC of the battery 4 monitored by the load monitoring unit 7, and the operation status of the load apparatus 1, the higher-hierarchy control unit 10 controls the electric power generator 3 and the engine 2 through the intermediaries of the electric power generator control unit 9 and the engine control unit 6, respectively. In other words, for example, in the case where the load apparatus 1 consumes electric power and hence the charging status SOC of the battery 4 is "insufficient", the higher-hierarchy control unit 10 determines that charging operation for the battery 4 is required and outputs the electric power generator power command value Pc_ref1 to the electric power generator control unit 9 and outputs the engine torque command value Te_ref corresponding to the electric power generator power command value Pc_ref1 to the engine control unit 6, so that the battery 4 is charged.

In contrast, in the case where, for example, the load apparatus 1 continues electric power regeneration operation and hence the charging status SOC of the battery 4 is "overcharged", the higher-hierarchy control unit 10 determines that discharging operation for the battery 4 is required and outputs the electric power generator power consumption command value Pc_ref2 to the electric power generator control unit 9 and outputs to the engine 2 an exhaust valve operation command value Bs for closing the exhaust valve in accordance with the value of the electric power generator power consumption command value Pc_ref2, so that power consumption by the apparatuses is facilitated and hence the battery 4 is discharged.

Figure 2:
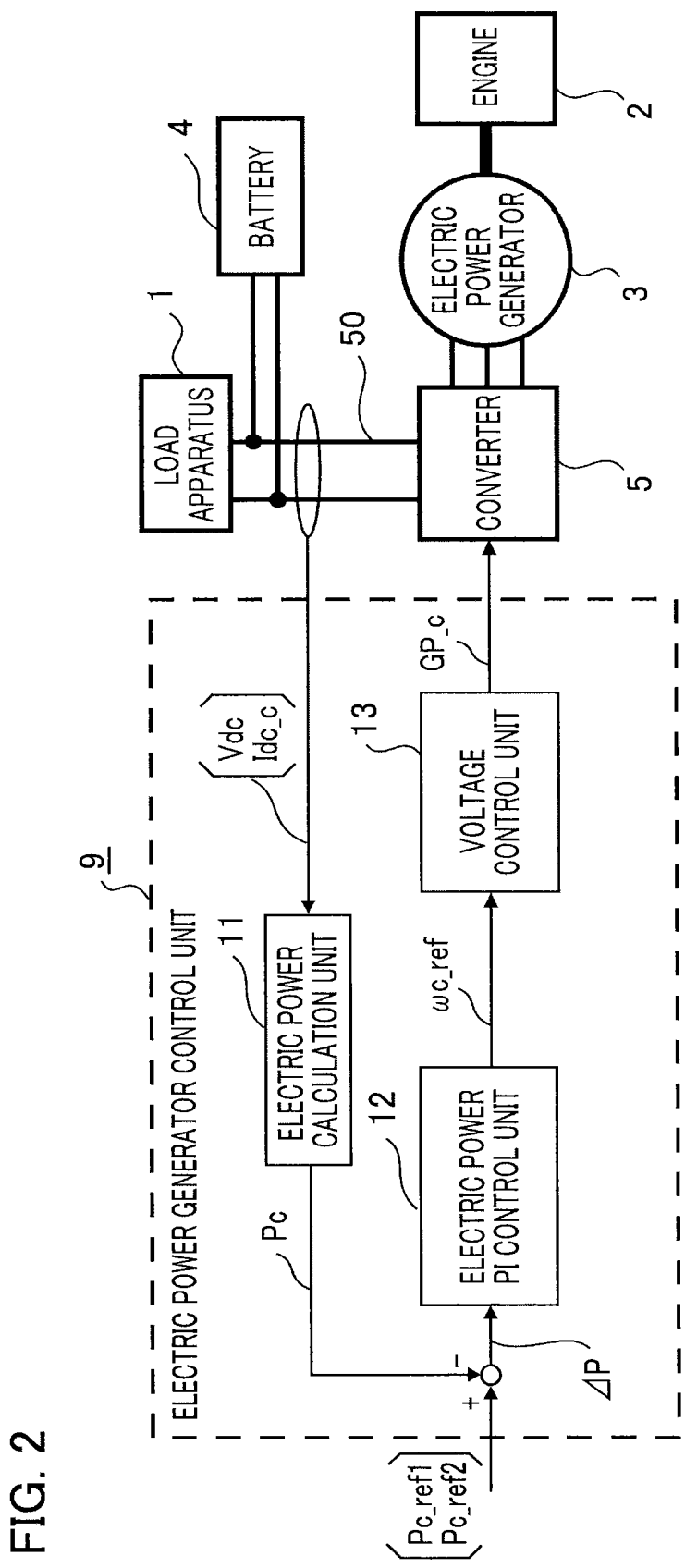
FIG. 2 is a block diagram illustrating the power generator control unit of a hybrid-vehicle power generator control apparatus according to Embodiment 1 of the present invention.

Next, there will be explained the electric power generator control unit 9 in the hybrid-vehicle power generator control apparatus according to Embodiment 1 of the present invention. FIG. 2 is a block diagram illustrating the electric power generator control unit in the hybrid-vehicle power generator control apparatus according to Embodiment 1 of the present invention; in FIG. 2, the electric power generator control unit 9 is configured with an electric power calculation unit 11, an electric power PI control unit 12, and a voltage control unit 13.

In the electric power generator control unit 9, the electric power calculation unit 11 multiplies the DC voltage value Vdc detected by the voltage sensor provided in the intermediate DC link unit 50 by the input/output current value Idc_c of the converter detected by the current sensor provided in the intermediate DC link unit 50 so as to calculate and output an electric power generator power value Pc. The electric power PI control unit 12 receives a difference electric power value ΔP between the electric power generator power value Pc from the electric power calculation unit 11 and the electric power generator power command value Pc_ref1 or the electric power generator power consumption command value Pc_ref2 from the higher-hierarchy control unit 10 and calculates and outputs an electric power generator rotation speed command value ωc_ref for making the difference electric power value ΔP "0".

Based on the electric power generator rotation speed command value ωc_ref calculated by the electric power PI control unit 12, the voltage control unit 13 calculates a three-phase voltage command value; then, the voltage control unit 13 generates a gate signal GP_c for PW-modifying the output voltage of the converter 5, based on the electric power generator rotation speed command value ωc_ref, and outputs the gate signal GP_c to the converter 5.

The electric power generator control unit 9 configured in such a manner as described above inputs to the electric power PI control unit 12 the difference electric power value ΔP between the electric power generator power value Pc from the electric power calculation unit 11 and the electric power generator power command value Pc_ref1 or the electric power generator power consumption command value Pc_ref2 from the higher-hierarchy control unit 10; through a proportional-integral calculation based on various kinds of gains that have been set by preliminarily taking a desired response into consideration, the electric power PI control unit 12 calculates electric power generator rotation speed command value ωc_ref for making the difference electric power value ΔP "0" and inputs the electric power generator rotation speed command value ωc_ref to the voltage control unit 13.

Based on the inputted electric power generator rotation speed command value ωc_ref, the voltage control unit 13 calculates a three-phase voltage command value and generates the gate signal GP_c corresponding to the three-phase voltage command value; then, the voltage control unit 13 inputs the gate signal GP_c to a PWM control apparatus (unillustrated). Based on the gate signal GP_c from the voltage control unit 13, the converter 5 performs so-called V/F constant control in which the ratio of the voltage V of the electric power generator 3 to the frequency F thereof becomes constant.

The foregoing V/F constant control is, as is well known, a control method in which control is performed in such a way that the primary voltage value V of an electric power generator (motor) is in proportion to the primary frequency value F thereof (e.g., refer to Non-Patent Document 1); the foregoing electric power generator rotation speed command value ωc_ref corresponds to first frequency value F, and the three-phase voltage command value corresponds to the primary voltage value V.

As described above, the hybrid-vehicle power generator control apparatus according to Embodiment 1 of the present invention is characterized in that there is calculated the electric power generator rotation speed command value ωc_ref for making "0" the difference electric power value ΔP between the electric power generator power value Pc from the electric power calculation unit 11 and the electric power generator power command value Pc_ref1 or the electric power generator power consumption command value Pc_ref2 outputted by the higher-hierarchy control unit 10, in that based on the electric power generator rotation speed command value ωc_ref, the output voltage V of the converter 5 is adjusted so that the rotation speed of the electric power generator 3 keeps track of the electric power generator rotation speed command value ωc_ref, and in that the electric power of the electric power generator 3 keeps track of the electric power generator power command value Pc_ref1 or the electric power generator power consumption command value Pc_ref2.

The hybrid-vehicle power generator control apparatus according to Embodiment 1 of the present invention demonstrates an effect that even in the case where there exist variations in the engine characteristic caused by the variations in the engine operation conditions based on the oil temperature, the lubrication condition, the maintenance situation, and the like, the generated electric power of the electric power generator is made to keep track of the electric power generator power command value Pc_ref1 or the electric power generator power consumption command value Pc_ref2 so as to be stabilized. The rotation speed of the electric power generator is controlled based on the electric power generator rotation speed command value ωc_ref, so that there can be demonstrated an effect that there can be suppressed fluctuations in the mechanical responsiveness caused by variations in the engine operation condition based on the oil temperature, the lubrication condition, and the like.

In the foregoing explanation, as a method of calculating the electric power generator power value Pc, there has been described a case where the electric power calculation unit 11 multiplies the DC voltage value Vdc detected by the voltage sensor provided in the intermediate DC link unit 50 by the input/output current value Idc_c of the converter detected by the current sensor provided in the intermediate DC link unit 50; however, an equivalent effect can be demonstrated through another method that can obtain an electric power generator power value with a considerable accuracy, for example, a method in which the electric power generator power value Pc is calculated based on the input AC voltage value, the input AC current value, and the power factor of an electric power generator.

Embodiment 2

Next, there will be explained a hybrid-vehicle power generator control apparatus according to Embodiment 2 of the present invention. The hybrid-vehicle power generator control apparatus according to Embodiment 2 of the present invention is obtained by adding a closed-loop speed control function to the generator control apparatus according to Embodiment 1.

Figure 3:
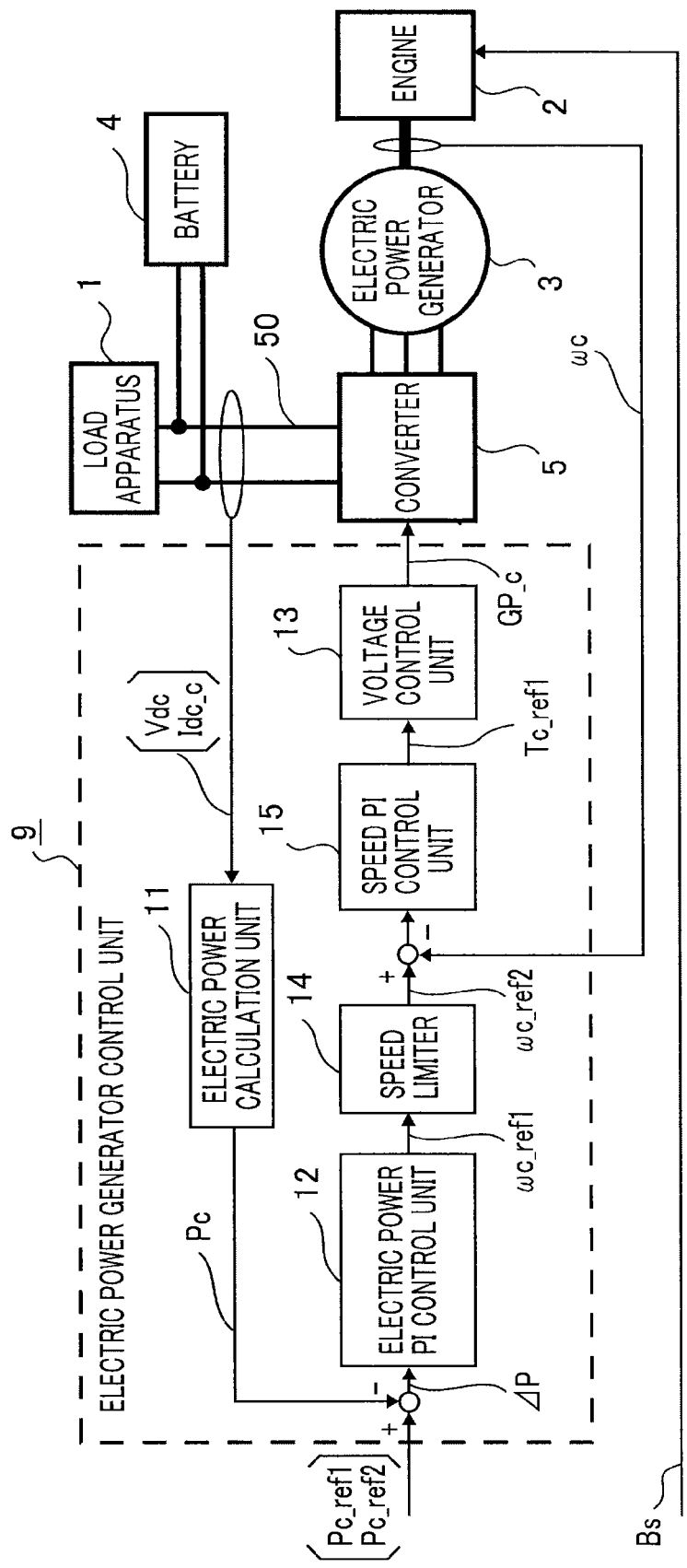
FIG. 3 is a block diagram illustrating the power generator control unit of a hybrid-vehicle power generator control apparatus according to Embodiment 2 of the present invention.

FIG. 3 is a block diagram illustrating the electric power generator control unit in the hybrid-vehicle power generator control apparatus according to Embodiment 2 of the present invention. In FIG. 3, the electric power generator control unit 9 is configured with the electric power calculation unit 11, the electric power PI control unit 12, the voltage control unit 13, a speed limiter 14, and a speed PI control unit 15. The other configurations are the same as those in Embodiment 1.

In the electric power generator control unit 9 configured in such a way as described above, the electric power calculation unit 11 multiplies the DC voltage value Vdc detected by the voltage sensor provided in the intermediate DC link unit 50 by the input/output current value Idc_c of the converter detected by the current sensor provided in the intermediate DC link unit 50 so as to calculate the electric power generator power value Pc.

The electric power PI control unit 12 receives a difference electric power value ΔP between the electric power generator power value Pc from the electric power calculation unit 11 and the electric power generator power command value Pc_ref1 or the electric power generator power consumption command value Pc_ref2 from the higher-hierarchy control unit 10 and calculates and outputs an electric power generator rotation speed command value ωc_ref1 for making the difference electric power value ΔP "0".

The speed limiter 14 applies at least one of upper limit processing and lower limit processing to the electric power generator rotation speed command value ωc_ref1 outputted from the electric power PI control unit 12 so as to obtain an electric power generator rotation speed command value ωc_ref2.

Based on a difference rotation speed value Δω, which is the difference between the electric power generator rotation speed command value ωc_ref2 outputted from the speed limiter 14 and the electric power generator rotation speed ωc obtained through the rotor shaft of the electric power generator 3, the speed PI control unit 15 calculates an electric power generator torque command value Tc_ref1 and inputs Tc_ref1 to the voltage control unit 13.

In the case of Embodiment 2, by use of a gain preliminarily set based on a desired speed control response, the speed PI control unit 15 applies a proportional-integral calculation to the difference rotation speed value Δω so as to calculate and output the electric power generator torque command value Tc_ref1.

Based on so-called vector control, the voltage control unit 13 calculates a voltage command value, to be outputted to the converter 5, in such a way that the output torque of the electric power generator 3 keeps track of the electric power generator torque command value Tc_ref1 inputted from the speed PI control unit 15; then, based on the calculated voltage command value, the voltage control unit 13 generates the gate signal GP_c for PW-modulating the output of the converter and outputs GP_c to the converter 5.

Based on the gate signal GP_c from the voltage control unit 13, the output of the converter 5 is PWM-controlled by a PWM control apparatus (unillustrated) so as to control the output torque of the electric power generator 3 through the vector control. The torque control method through vector control is a well-known technology (e.g., refer to Non-Patent Document 2).

As described above, by providing a closed-loop speed control system in the electric power control system, a desired mechanical response can be set. For example, by setting the speed control system to a desired response, there can be demonstrated an effect that a fluctuation in the rotation speed of the mechanical system including the electric power generator 3 and the engine 2 can be suppressed even when the electric power generator power command value Pc_ref1 or the electric power generator power consumption command value Pc_ref2 drastically changes.

Figure 4:
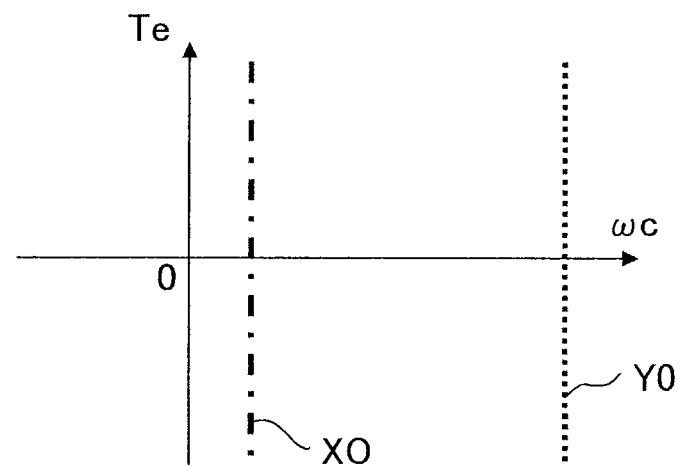
FIG. 4 is an explanatory chart for explaining the operation of a hybrid-vehicle power generator control apparatus according to Embodiment 2 of the present invention.

Furthermore, by making the speed limiter 14 specify the range of the rotation speed of the mechanical system, the control of the electric power and the control of the engine can be stabilized. The detail will be explained below. FIG. 4 is an explanatory chart for explaining the operation of a hybrid-vehicle power generator control apparatus according to Embodiment 2 of the present invention and represents an example of method of setting a lower limit value and an upper limit value of the speed limiter 14.

In FIG. 4, the abscissa denotes the electric power generator rotation speed $\omega c$, and the ordinate denotes the electric power generator torque Te. The lower limit value X0, represented by a dashed line, of the electric power generator rotation speed $\omega c$ is set in such a way that the rotation speed $\omega c$ of the electric power generator 3 becomes as high as the idling rotation speed of the engine 2. The upper limit value Y0, represented by a broken line, of the electric power generator rotation speed $\omega c$ is set to be, for example, 0.9 times as high as the maximum rotation speed of the engine so that the allowable maximum rotation speed of the engine 2, which is the design limit value, has a margin.

When by use of the speed limiter 14, the lower limit value X0 of the electric power generator rotation speed is set to be as high as the idling speed of the engine 2, the actual rotation speed is controlled by the electric power generator control unit 9 in such a way as not to be lower than the idling speed; therefore, there is demonstrated an effect that a reverse rotation and an engine stop phenomenon in which the engine 2 cannot autonomously rotate are prevented and hence stable operation can be continued.

By making the speed limiter 14 set the upper limit value Y0 of the electric power generator rotation speed to be the same as or lower than the design safety speed of the engine 2, the actual rotation speed is controlled so as to be lower than the set upper limit value even in the transient mode where the electric power generator power command value Pc_ref1 or the electric power generator power consumption command value Pc_ref2 largely changes; therefore, there can be demonstrated an effect that the electric power generator is prevented from reaching such a high-rotation mode where failure thereof is induced. The foregoing lower limit value X0 and the upper limit value Y0 are just examples; thus, it goes without saying that these values can be changed, as may be necessary.

Figure 5:
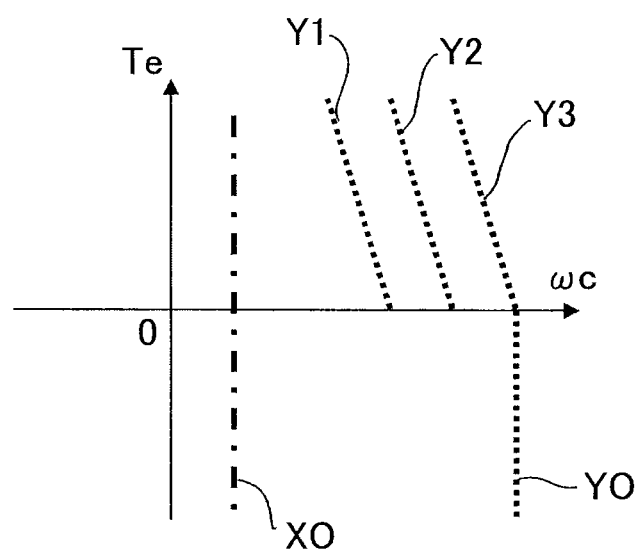
FIG. 5 is an explanatory chart for explaining the operation of a hybrid-vehicle power generator control apparatus according to Embodiment 2 of the present invention.

FIG. 5 is an explanatory chart for explaining the operation of a hybrid-vehicle power generator control apparatus according to Embodiment 2 of the present invention; FIG. 5 represents a method, of setting the upper limit value of the speed limiter 14, that is different from the method represented in FIG. 4. In FIG. 5, the abscissa denotes the electric power generator rotation speed $\omega c$, and the ordinate denotes the electric power generator torque Te. FIG. 5 represents a case where the speed limiter 14 determines the upper limit value of the speed of the electric power generator in accordance with the engine torque command value Te_ref and the electric power generator power command value Pc_ref1 or the electric power generator power consumption command value Pc_ref2. The lower limit value X0 of the speed of the electric power generator is determined in the same manner as that represented in FIG. 4.

In other words, the electric power generator power command value Pc_ref1 and the engine torque command value Te_ref that is determined in accordance with the electric power generator power command value Pc_ref1 are given in such a way as to correspond to a plurality of notches such as a first notch characteristic, a second notch characteristic, and a third notch characteristic; in accordance with the power consumption status of the load apparatus 1, these notch characteristics are switched and outputted based on the determination of the higher-hierarchy control unit 10. Accordingly, as represented in FIG. 5, the speed limiter 14 is provided with a first notch speed upper limit setting value Y1, a second notch speed upper limit setting value Y2, and a third notch speed upper limit setting value Y3, in accordance with respective maximum speeds anticipated from the driving characteristics based on the plurality of notch characteristics. The speed limiter 14 switches these speed upper limit setting values in accordance with a notch command specified by the higher-hierarchy control unit 10.

The speed limiter 14 is also provided with an engine brake/exhaust brake upper limit setting value Y0 that is set to be slightly lower than the allowable engine brake/exhaust brake maximum rotation speed of the engine 2, which is the design limit value, so that Y0 has a margin for the allowable engine brake/exhaust brake maximum rotation speed. The engine brake/exhaust brake upper limit setting value Y0 is set in such a way as to be, for example, 0.9 times as high as the allowable engine brake/exhaust brake maximum rotation speed of the engine 2, which is the design limit value.

The respective notch speed upper limit values can be set not only to the first through third notch speed upper limit values but also to the first through Nth notch speed upper limit values.

In the hybrid-vehicle power generator control apparatus according to Embodiment 2 of the present invention, the engine 2 is controlled in such a way as to be lower than the speed upper limit value anticipated based on each notch characteristic in the electric-power-generator power control condition given by each notch; therefore, there is demonstrated an effect that the rotation condition and the power generation condition can be stabilized regardless of the value of the electric power generator power command value Pc_ref1 or the electric power generator power consumption command value Pc_ref2.

Embodiment 3

Figure 6:
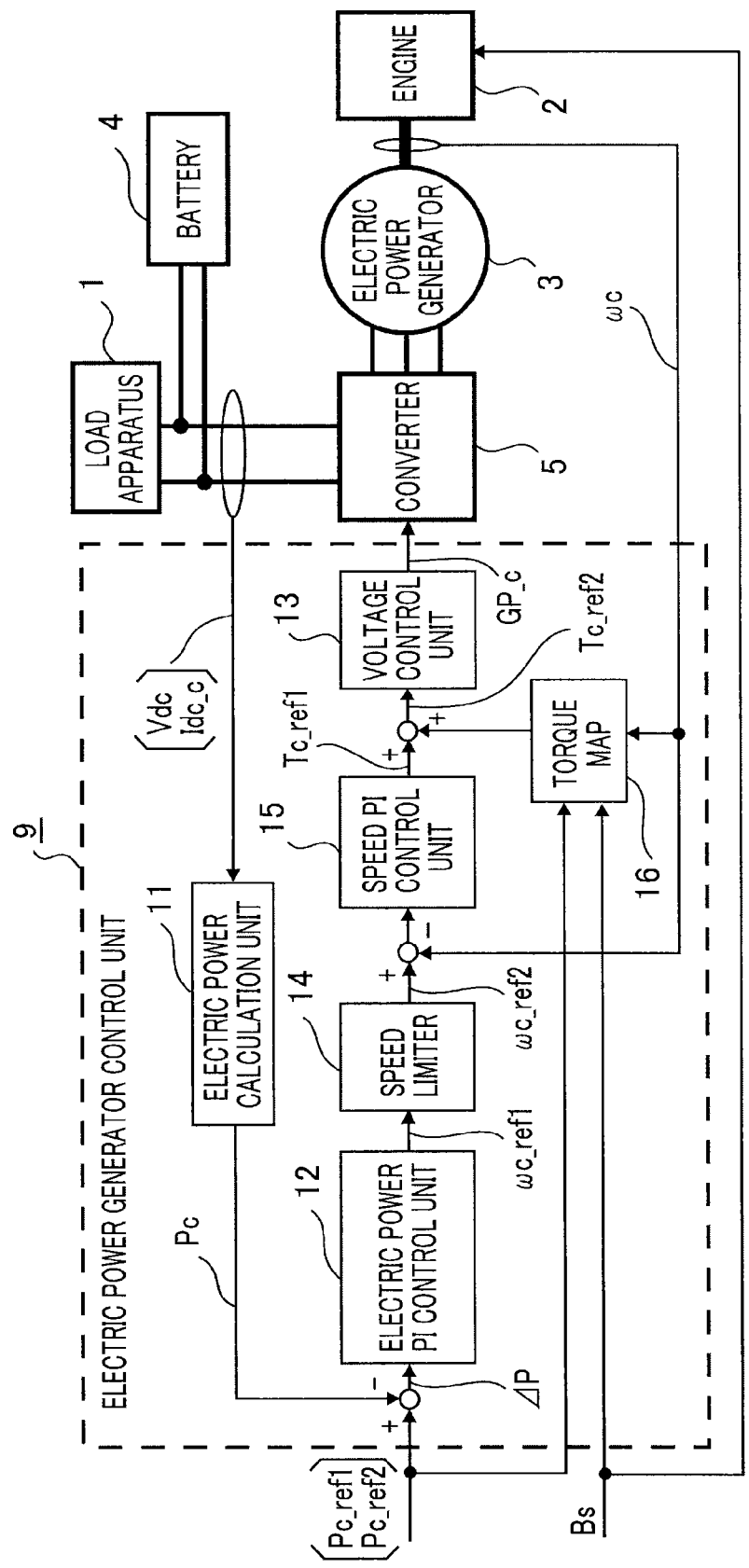
FIG. 6 is a block diagram illustrating the power generator control unit of a hybrid-vehicle power generator control apparatus according to Embodiment 3 of the present invention.

Next, there will be explained a hybrid-vehicle power generator control apparatus according to Embodiment 3 of the present invention. FIG. 6 is a block diagram illustrating the electric power generator control unit in the hybrid-vehicle power generator control apparatus according to Embodiment 3 of the present invention. In Embodiment of the present invention, a torque map 16 is added to the configuration of the electric power generator control unit 9 according to Embodiment 2.

In the torque map 16 of FIG. 6, as functions of the electric power generator speed, a first notch torque command characteristic Te_chara_1, a second notch torque command characteristic Te_chara_2, - - - an Nth notch torque command characteristic Te_chara_N corresponding to a first notch command, a second notch command, - - - an Nth notch command, an engine brake friction torque command characteristic Teb_chara1, and an exhaust brake engine friction torque command characteristic Teb_chara2 are set.

Then, in accordance with the electric power generator power command value Pc_ref1 and the type of the notch outputted by the higher-hierarchy control unit 10, the torque command characteristic Te_chara__1, Te_chara__2, - - - , Te_chara_N for each notch is selected from the torque map 16; then, based on the selected torque characteristic, a torque correction value Tc_ref2 is outputted from the torque map 16.

When the output command of the higher-hierarchy control unit 10 is the electric power generator power consumption command value Pc_ref2, the friction torque characteristic Teb_chara1 is selected from the torque map 16; then, based on the friction torque characteristic, a torque correction value Tc_ref2 is outputted.

When the output command of the higher-hierarchy control unit 10 is a larger electric power generator power consumption command value Pc_ref2 and the exhaust valve operation command value Bs is outputted, the friction torque characteristic Teb_chara2 is selected from the torque map 16; then, based on the friction torque characteristic, the torque correction value Tc_ref2 is outputted. The switching between the engine brake and the exhaust brake is performed based on the electric power generator power consumption command value.

As a result, the valve can be operated without delay, and an effect that the control sequence can be simplified is demonstrated.

The value obtained by adding the electric power generator torque command value Tc_ref1, which is the output of the speed PI control unit 15 and the torque correction value Tc_ref2 from the torque map 16 is inputted to the voltage control unit 13; based on the inputted value, the voltage control unit 13 calculates a voltage command value to be outputted to the converter 5; then, based on the calculated voltage command value, the voltage control unit 13 generates the gate signal GP_c for PW-modulating the output of the converter 5 and then outputs GP_c to the converter 5.

Based on the gate signal GP_c from the voltage control unit 13, the output of the converter 5 is PWM-controlled by a PWM control apparatus (unillustrated) so as to control the output torque of the electric power generator 3 through the vector control.

As described above, in the hybrid-vehicle power generator control apparatus according to Embodiment 3 of the present invention, the torque correction value Tc_ref2 from the torque map 16 works as a feed-forward function for a response delay of the electric power PI control unit 12 caused by a change in the command from the higher-hierarchy control unit 10; thus, there can be demonstrated an effect that transition between power generation conditions can quickly and stably be implemented. Moreover, there is demonstrated an effect that the power consumption characteristic is maintained even when the engine brake or the exhaust brake is implemented and the electric power to be generated can be controlled at a desired value regardless of variations in the oil temperature, the lubrication condition, and the like at a time when the engine is operated.

The torque command characteristics Te_chara__1 through Te_chara_N and the friction torque characteristics Teb_chara1 and Teb_chara2 for the respective notches are obtained through preliminary designing and testing and then are preliminarily set; however, the torque command characteristics and the friction torque characteristics do not include information on the variation, corresponding to the operation condition, in the actual engine torque output. In that sense, the torque accuracy at a time when the engine is actually operated is not satisfied. However, as described above, the torque correction value Tc_ref2 from the torque map 16 is utilized in the feed-forward control function for improving the responsiveness; thus, the torque accuracy in the steady characteristic is not required so much. The electric power PI control unit 12 and the speed PI control unit 15 have the functions for securing the steady accuracy in controlling of generated electric power.

In the scope of the present invention, the embodiments thereof can freely be combined with one another and can appropriately be modified or omitted.

INDUSTRIAL APPLICABILITY

The present invention can be utilized as a power generator control apparatus for a hybrid vehicle, especially, for a railroad hybrid vehicle.

DESCRIPTION OF REFERENCE NUMERALS

1: load apparatus
2: engine
3: electric power generator
4: battery
5: converter
6: engine control unit
7: load monitoring unit
8: load apparatus control unit
9: electric power generator control unit
10: higher-hierarchy control unit
11: electric power calculation unit
12: electric power PI control unit
13: voltage control unit
14: speed limiter
15: speed PI control unit
16: torque map

The invention claimed is:

1. An electric power generator control apparatus for a hybrid vehicle, comprising:
   an electric power generator whose rotor is coupled with an output shaft of an engine;
   an electric-power conversion system that performs electric power conversion between the electric power generator and a load apparatus;
   an electric power generator control unit that PWM-controls the electric-power conversion system so as to control an output of the electric power generator;
   a load monitoring unit that monitors status of the load apparatus; and
   a higher-hierarchy control unit that issues an electric power generator power command value to the electric power generator control unit, based on the status of the load apparatus detected by the load monitoring unit, wherein
   the electric power generator power command value that is given from the higher-hierarchy control unit to the electric power generator control unit includes at least one of an electric power generator power command value that specifies electric power to be outputted by the electric power generator and an electric power generator power consumption command value that specifies electric power to be consumed by the electric power generator,
   when the higher-hierarchy control unit issues an electric power generator power consumption command value that specifies electric power to be consumed by the electric power generator, as the electric power generator power command value, based on a difference electric power value, which corresponds to the difference between the electric power generator power consumption command value given by the higher-hierarchy control unit and an output electric power value of the electric power generator, the electric power generator control unit calculates an electric power generator rotation speed command value and based on the calculated electric power generator rotation speed command value, the electric power generator control unit PWM-controls an output of the electric-power conversion system, so that the rotation speed of the electric power generator is made to keep track of the electric power generator rotation speed command value and the output electric power value of the electric power generator is made to keep track of the electric power generator power command value.

2. The electric power generator control apparatus according to claim 1, wherein
when the higher-hierarchy control unit issues the electric power generator power consumption command value which is more than a predetermined threshold value, the higher-hierarchy control unit outputs an exhaust valve operation command for closing the exhaust valve provided in the engine in accordance with the value of the electric power generator power consumption together with the electric power generator power consumption command value.

3. The electric power generator control apparatus according to claim 2, wherein the electric power generator control unit includes
an electric power calculation unit that calculates an output electric power value of the electric power generator,
an electric power PI control unit that calculates the electric power generator rotation speed command value, based on the difference electric power value,
a speed limiter that sets at least one of a lower limit value and an upper limit value for the calculated electric power generator rotation speed command value,
a torque map unit that includes a plurality of torque command characteristics corresponding to an existence of operation of the exhaust valve, that selects one of the plurality of torque command characteristics, based on the exhaust valve operation command outputted from the higher-hierarchy control unit, and that outputs a torque correction value, based on the selected torque command characteristic, and
a voltage control unit that PWM-controls the electric-power conversion system, based on the electric power generator rotation speed command value inputted by way of the speed limiter and the torque correction value outputted from the torque map unit.

4. The electric power generator control apparatus according to claim 1, wherein the electric power generator control unit includes
an electric power calculation unit that calculates an output electric power value of the electric power generator,
an electric power PI control unit that calculates the electric power generator rotation speed command value, based on the difference electric power value, and
a voltage control unit that PWM-controls the electric-power conversion system, based on the calculated electric power generator rotation speed command value.

5. The electric power generator control apparatus according to claim 1, wherein the electric power generator control unit includes
an electric power calculation unit that calculates an output electric power value of the electric power generator,
an electric power PI control unit that calculates the electric power generator rotation speed command value, based on the difference electric power value,
a speed limiter that sets at least one of a lower limit value and an upper limit value for the calculated electric power generator rotation speed command value, and
a voltage control unit that PWM-controls the electric-power conversion system, based on the electric power generator rotation speed command value inputted by way of the speed limiter.

6. The electric power generator control apparatus according to claim 5, wherein the speed limiter sets the lower limit value for the electric power generator rotation speed command value to a value corresponding to an idling rotation speed of the engine.

7. The electric power generator control apparatus according to claim 5, wherein the speed limiter includes an engine brake and exhaust brake upper limit setting value that is set to be slightly lower than the allowable engine brake and exhaust brake maximum rotation speed of the engine.

* * * * *